United States Patent
Roobol et al.

(10) Patent No.: US 6,307,867 B1
(45) Date of Patent: Oct. 23, 2001

(54) DATA TRANSMISSION OVER A COMMUNICATIONS LINK WITH VARIABLE TRANSMISSION RATES

(75) Inventors: Christiaan Roobol, Hasselby; Mathias Johansson, Solluntuna; Johan Lundsjö, Bromma; Per Beming, Stockholm, all of (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 09/078,598

(22) Filed: May 14, 1998

(51) Int. Cl.⁷ .................................................. H04J 3/22
(52) U.S. Cl. ..................... 370/470; 370/342; 370/347; 375/225
(58) Field of Search ................................ 370/328, 329, 370/335, 336, 337, 342, 345, 347, 465, 469, 470, 472; 375/222, 225

(56) References Cited

U.S. PATENT DOCUMENTS

| | | | |
|---|---|---|---|
| 5,442,625 | * | 8/1995 | Gitlin et al. ........................... 370/342 |
| 5,544,156 | * | 8/1996 | Teder et al. ........................... 370/342 |
| 5,940,439 | * | 8/1999 | Kleider et al. ........................ 375/225 |
| 6,064,678 | * | 5/2000 | Sindhushayana et al. ........... 370/470 |
| 6,088,590 | * | 7/2000 | Anderson et al. .................... 455/437 |
| 6,097,716 | * | 8/2000 | Abrishamkar ........................ 370/342 |
| 6,108,372 | * | 8/2000 | Tidemann, Jr. et al. ............. 375/225 |
| 6,134,278 | * | 10/2000 | Abrishamkar et al. .............. 375/341 |

FOREIGN PATENT DOCUMENTS

| | | |
|---|---|---|
| 0 350 238 A | 1/1990 | (EP) . |
| 0 836 293 A | 4/1998 | (EP) . |
| 2249927 | 5/1992 | (GB) . |
| 95/01032 A | 1/1995 | (WO) . |
| 97/16046 A | 5/1997 | (WO) . |
| 98/18242 A | 4/1998 | (WO) . |

OTHER PUBLICATIONS

*VTC '98, 48th IEEE Vehicular Technology Conference*, Pathway to Global Wireless Revolution (Cat. No. 98CH36151), Ottawa, Ontario, Canada, vol. 1, May 18–21, 1998, pp. 107–111, XP002114338, C. Roobol et al., "A proposal for an RLC/MAC protocol for wideband CDMA capable of handling real time and non–real time services".

* cited by examiner

*Primary Examiner*—Ajit Patel
*Assistant Examiner*—Bob A. Phunkulh
(74) *Attorney, Agent, or Firm*—Nixon & Vanderhye P.P.

(57) ABSTRACT

An optimal data block size is determined for use in transmitting data at variable rates over a communications link in predetermined time intervals, where each predetermined time interval has the same time duration. Rather than varying data block size according to changes in transmission rates, which adds unnecessary complexity, the data blocks all have the same fixed size, i.e., the same number of data bits in each block. That fixed data block size is determined so that for all of the available data transmission rates, each predetermined time interval is fully occupied with useful information. The fixed data block size is determined based on a maximum frequency at which the transmission rate may change on the communications link and a lowest available transmission rate. Preferably, the fixed size of each data block is limited by predetermined maximum and minimum data block sizes in order to reduce the number of bit errors per data block, maintain a certain data throughput, and limit the amount of overhead bits relative to the number of payload bits for each data block.

33 Claims, 6 Drawing Sheets

DATA TRANSMISSION OVER A COMMUNICATIONS LINK WITH VARIABLE TRANSMISSION RATES

TECHNICAL FIELD OF THE INVENTION

The present invention relates to data communications, and more particularly, to transmitting data blocks over a communications link where the transmission rate varies.

BACKGROUND AND SUMMARY OF THE INVENTION

In the evolving area of wireless communications, the number of services which may be provided between a mobile station (MS) and a base station (BS) have greatly increased and include real time services, such as speech and video, as well as non-real time services, such as file transfers and electronic mail messages. Each service typically has different transmission format requirement. One transmission format requirement is the transmission rate over the radio channel between the mobile station and base station. A radio channel may correspond to a radio frequency in a frequency division multiple access (FDMA) system, a time slot in a time division multiple access (TDMA) system, and a spreading code in a code division multiple access (CDMA) system. Because of the variability of services that need to be delivered, the transmission rate on the radio channel may change at a fairly high frequency. In fact, in some systems, the rate at which the radio channel may change may be on the order of every ten milliseconds. For higher transmission rates, the number of data bits transmitted in each time frame can be quite large. On the other hand, for relatively low transmission rates, a much smaller number of data bits is transmit during that same time frame.

This variability in transmission rates poses a problem that is particularly troublesome in the radio environment where data is often corrupted as a result of fading, shadowing, interference, etc. To account for bit errors resulting from such corruption, an Automatic Repeat reQuest (ARQ) protocol may be employed which uses positive and/or negative acknowledgments with retransmission techniques to ensure reliable data communications. If a data message is received in error, the receiver sends a retransmit request to the sender, and the sender automatically retransmits the data message. The message to be retransmitted is typically divided into a number of smaller data blocks. Each data block contains a sequence number for identification purposes used when those retransmitted blocks are received and sequenced at the receiver.

It is important to carefully choose the size, i.e., number of bits, in each of these smaller blocks. The larger the data block size, the larger the probability that the retransmitted block will be received with too many errors. In order to keep the number of errors down in such a large block situation, a very high quality radio channel is required which is either unobtainable under current conditions or "expensive" in the sense it consumes limited capacity. On the other hand, as the size of the data blocks decreases, the effective data rate or throughput also decreases because the number of overhead bits used in each of the data blocks, e.g., sequence number, error correction and detection bits, etc., increases relative to the number of actual "payload" data bits that make up the substantive data message.

The fact that the transmission rate on a radio channel or any type of communication channel may change frequently complicates the determination of the appropriate data block size. Consider the example shown in FIG. 1 where the block size is 640 bits. The data transmission rate may change to one of two rates: 64 kbit/s and 32 kbit/s. The frequency at which the transmission rate may change corresponds with the frame interval of ten milliseconds. In other words, the transmission rate is only permitted to change at the end of and not during each ten millisecond frame interval.

At the higher 64 kbit/s transmission rate during the first frame interval, the entire data block of 640 bits are allocated to a single ten millisecond frame interval. After that time interval, the transmission rate is changed to 32 kbit/s, and during the subsequent ten millisecond frame interval, only one half of the 640 bits in the next data block are transmitted during the second frame interval. Following the second, ten millisecond frame interval, another rate change occurs increasing the transmission rate back up to 64 kbit/s. At this higher transmission rate, transmission of the remaining 320 bits of the second half of the data block takes only one half of the third, ten millisecond frame interval. This leaves the latter half of the third frame interval "empty" which then is filled with "dummy" bits. The failure to transmit useful information during portions of frame intervals wastes precious resources (especially in a radio communications context) and reduces the effective data throughput rate over the radio channel.

One way of handling this variable transmission rate problem is to adapt the data block size (the number of bits in each block) to the current transmission rate. However, this approach causes difficulties when data blocks must be retransmit as a result of corruption over the communications link. For example, consider the situation where a large size data block is initially transmit at a high data transmission rate in one ten millisecond frame interval. That large block is corrupted, and therefore must be retransmitted. At the later time when the large data block is be retransmit, the transmission rate at that time may have changed, e.g., to a lower transmission rate. Because of the lower rate, the large block of data cannot be transmitted in a single ten millisecond time interval, and one or more additional frame intervals must be used to transmit the remaining data. Very likely, one of the frame intervals is transmitted with less than a fill payload.

It is an object of the present invention to provide a method for determining an optimal data block size for use in communications systems where variable transmission rates may be employed.

It is a further object of the present invention to determine an optimal data block size so that communication resources are not wasted.

It is another object of the present invention to determine a fixed block size so as to eliminate complexities associated with variable block sizes.

The present invention solves these problems and achieves the stated objectives by providing a method for determining an optimal data block size. The data block size may be advantageously used to transmit data at variable rates over a communications link in predetermined time intervals, where each predetermined time interval has the same time duration. Rather than varying data block size according to changes in the transmission rates which adds unnecessary complexity, the data blocks in accordance with the present invention all have the same fixed size, i.e., have the same number of data bits in each block. That fixed data block size is determined so that for all of the available variable rates at which data may be transmitted, each predetermined time interval is fully occupied with useful information, i.e., there is no unused or "filled" portion of one of the time intervals. Even though data may be initially transmit at a first transmission rate in the fixed size data blocks, when a change is detected from the first transmission rate to a second transmission rate, bits are allocated and transmit at the second transmission rate into the same fixed size data blocks.

The fixed data block size is determined based on a maximum frequency at which the transmission rate may change on the communications link and a lowest available transmission rate. Preferably, the fixed size of each data block is limited by predetermined maximum and minimum data block sizes in order to reduce the number of bit errors per data block, maintain a certain data throughput, and limit the amount of overhead bits relative payload bits.

In addition to initial data transmissions between two communications devices over a communications link, the present invention is also beneficial in the context of an Automatic Repeat reQuest (ARQ) procedure. If a data message is determined to be unreliable, e.g., too many bit errors, a request is sent to the transmitting communication device to retransmit that data message. Even though the data message was initially transmit using a first transmission format specifying a first transmission rate, the transmission format may have changed to a second format which specifies a second different transmission rate when the message is to be retransmit. In an example embodiment, the data message to be retransmit is segmented or divided at a data link protocol layer into fixed size protocol data units (PDUs) where each fixed size PDU has the same number of bits irrespective of transmission rate or other format. The fixed size PDUs are then transmit over a first physical protocol layer using the second transmission format specifying a second transmission rate different from the first transmission rate at which the data message was originally transmitted. The fixed PDU size is selected so that the time intervals are fully used despite frequent changes in transmission formats and rates over the communications link. In other words, time intervals are fully occupied with useful information without having to add filler data bits to complete that frame time interval.

Although the present invention may be advantageously applied to any communications device in any data communications system, a preferred advantageous application is to data communications between a mobile station and base station, and in particular, to code division multiple access (CDMA) mobile communications systems. A first communications protocol layer employs spreading codes in transmitting PDUs over a radio communications link. A second communications protocol layer above the first layer corresponds to a radio link control/medium access control (RLC/MAC) protocol layer. The RLC layer performs the segmenting of data into the fixed PDUs for transmission over the radio interface.

BRIEF DESCRIPTION OF THE DRAWINGS

The foregoing and other objects, features, and advantages of the invention will be apparent from the following description of preferred example embodiments as illustrated in the accompanying drawings in which reference characters refer to the same parts throughout the various views. The drawings are not necessarily to scale, emphasis instead being placed upon illustrating the principles of the invention.

DETAILED DESCRIPTION OF THE INVENTION

In the following description, for purposes of explanation and not limitation, specific details are set forth, such as particular embodiments, data structures, hardware configurations, data rates, techniques, etc., in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description of the present invention with unnecessary detail.

Figure 1:
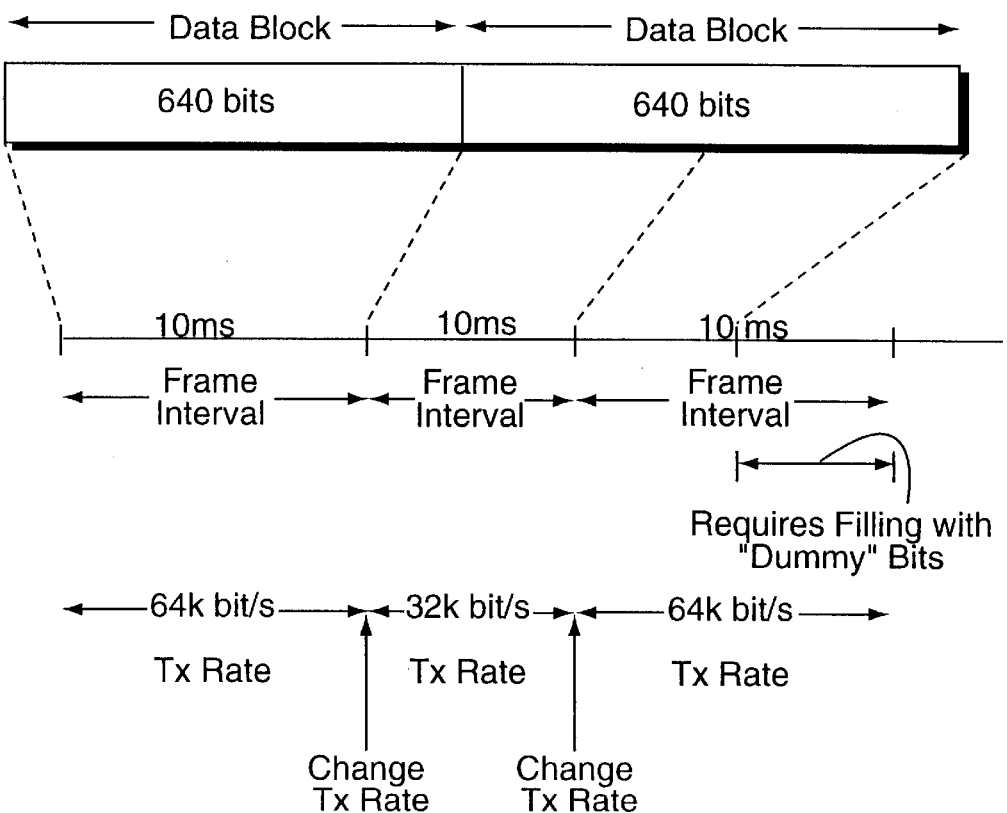
FIG. 1 is a diagram illustrating one of the problems resulting from variable rate communications solved by the present invention.
Figure 2:
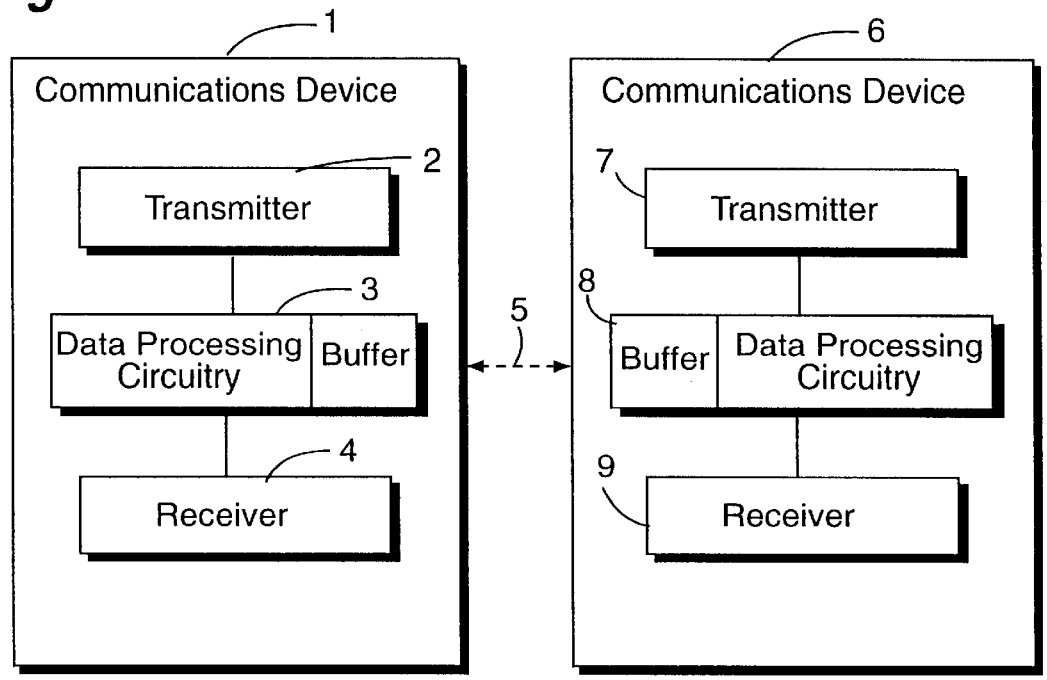
FIG. 2 is a function block diagram illustrating example communications devices and a communications link therebetween where the present invention may be advantageously employed in accordance with a first example embodiment of the present invention.

FIG. 2 illustrates a general communications system in which the present invention may be employed in a first example embodiment. A sending communications device 1 communicates over a communications link 5 with a receiving communications device 6. Communications link 5 may correspond to any type of communications media including a wire, an optical fiber, a microwave link, a radio link, etc. and may employ any number of different communications formats suitable for transmission over any of the communications media. The transmission rate over communication link 5 may be varied quite frequently at predetermined intervals. In the example shown in FIG. 1 described above, the predetermined interval corresponds to a frame interval of ten milliseconds.

Communications device 1 includes a transmitter 2, data processing circuitry 3 including one or more buffers, and a receiver 4. Similarly, communications device 6 includes a transmitter 7, data processing circuitry 8 including one or more buffers, and a receiver 9. The data processing circuitry 3 in sending communications device 1 transmits via the transmitter 2 information over the communications link 5 using fixed size data blocks. The size is independent of the current transmission rate over the communications link 5.

Figure 3:
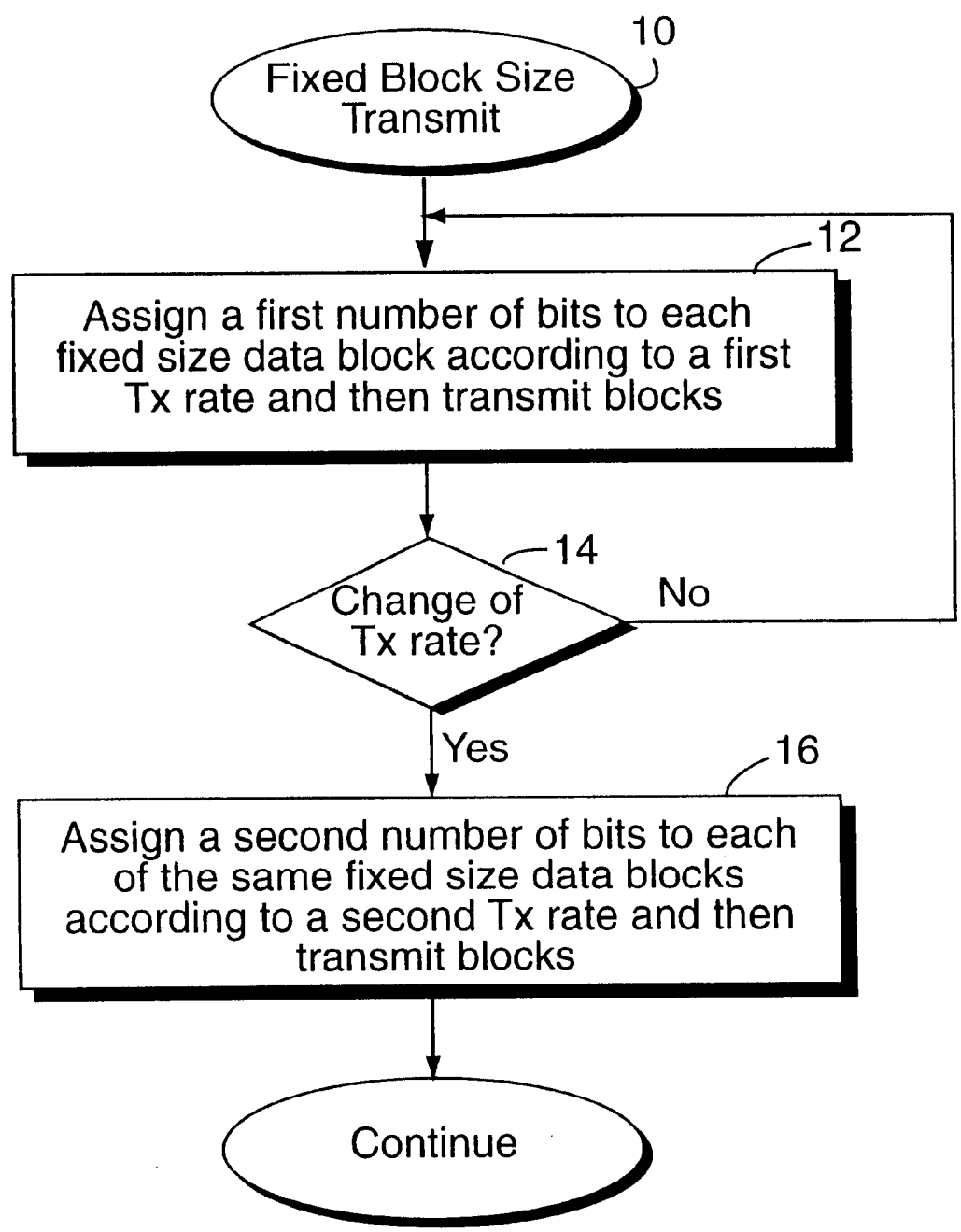
FIG. 3 is a flowchart diagram illustrating example procedures according to a Fixed Block Size Transmit routine 10 in accordance with the first example embodiment.

In that regard, reference is now made to the Fixed Block Size Transmit routine 10 illustrated in flowchart format in FIG. 3. A first number of bits is assigned to each fixed size data block according to a first transmission rate. Those data blocks are sent via transmitter 2 over communications link 5 to the receiving communications device 6 (block 12). A decision is made in block 14 whether the transmission rate for transmitting data over communications link 5 has changed. If the rate has changed, a second number of bits is assigned to the same fixed size data blocks according to a second transmission rate. The transmitter 2 transmits those fixed blocks at that second transmission rate over the communications link 5 (block 16).

Figure 4:
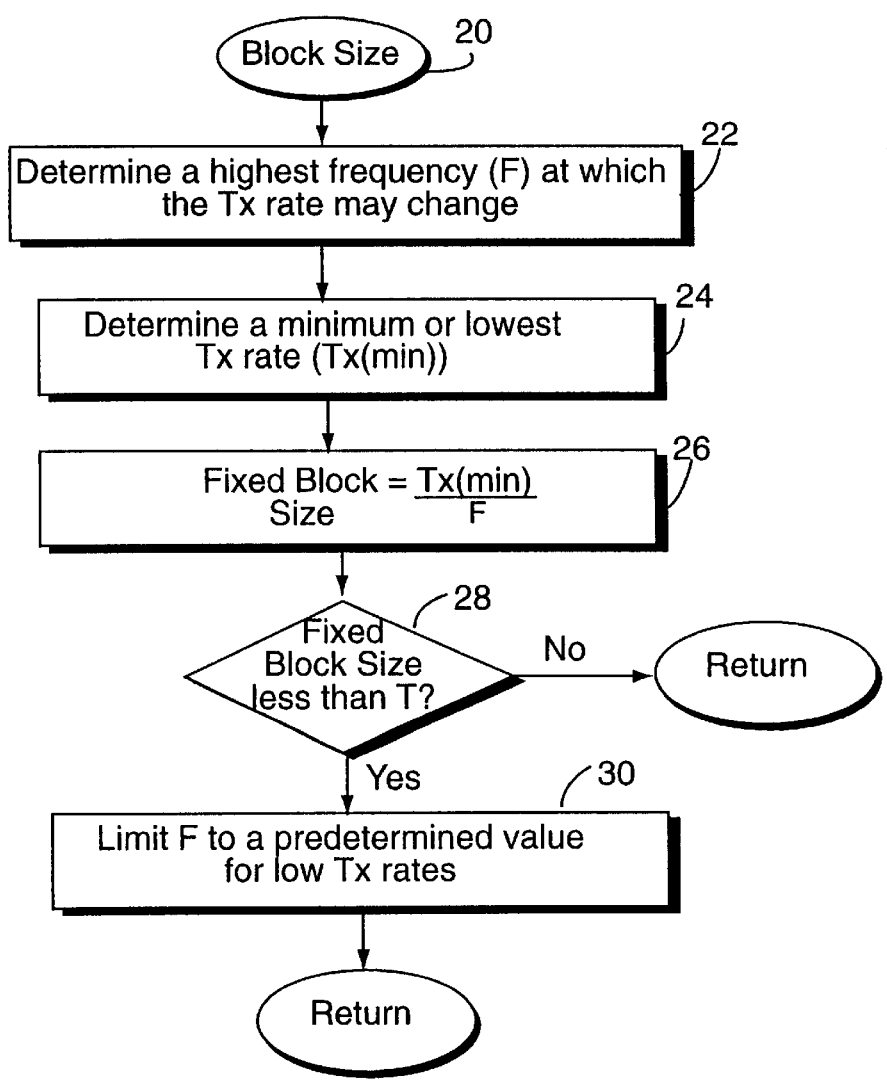
FIG. 4 is a flowchart diagram illustrating example procedures for determining a data block size in accordance with the first example embodiment.

An important aspect of the present invention is the determination of an optimal block size to be fixed for all of the available data transmission rates that may be employed over the communications link 5. Accordingly, reference is now made to the Block Size routine 20 illustrated in flowchart format in FIG. 4. A frequency (F) at which the transmission rate over communications link 5 may change is determined (block 22), i.e., the number of transmission rate changes/time unit. In addition, a minimum or lowest available transmission rate (Tx(min)) over the communications link is determined (block 24). A fixed block size is then determined (block 26) in accordance with the following equation:

$$\text{fixed block size} = \frac{Tx(\min)}{F} \quad (1)$$

Figure 5:
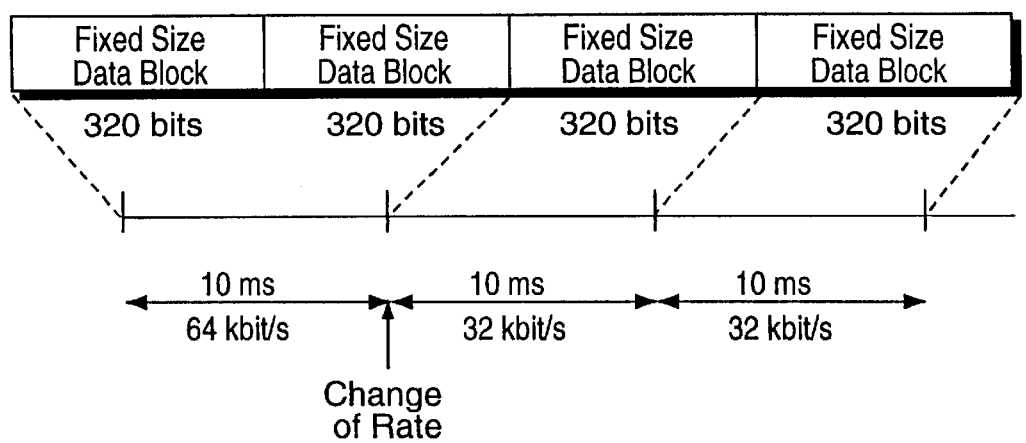
FIG. 5 is a diagram illustrating an example of how the present invention can be employed over a communications link in which the transmission rate is changed over the communications link.

Consider now the example transmission scenario over communications link 5 shown in FIG. 5 in which the present invention is employed. Assuming a frame interval of ten milliseconds is the highest frequency at which the transmission rate may change over communications link 5, and assuming two available transmission rates of 64 kbit/s and 32 kbit/s, the fixed block size in accordance with equation (1) above is ten milliseconds * 32 kbit/s. Accordingly, each fixed data block contains 320 bits. Assuming the initial transmission rate is the higher 64 kbit/s, each transmitted ten millisecond frame interval contains two, 320 bit, data blocks for a total of 640 bits. When the transmission rate changes at the end of the ten millisecond frame interval to 32 kbit/s, only a single 320 bit data block is transmitted per each frame interval.

Despite the fact that the transmission rate changes after only ten milliseconds, the optimally calculated fixed block size ensures that the ten millisecond intervals are fully occupied. Those skilled in the art will appreciate that fully occupied means that bit positions in a frame interval are not wasted. In other words, there is no substantial portion of a frame interval that does not contain useful information including either overhead or payload bits. For example, the present invention as illustrated in FIG. 5 contrasts with the similar scenario shown in FIG. 1 in which one half of a ten millisecond frame interval is transmit without any useful information. Transmission of dummy bits during that useless portion of the frame interval is wasteful and inefficient.

It may be desirable to place some constraints on the size of the fixed data block depending upon parameters of the variable transmission rate communication link. For example, if the block size is too small, a larger percentage of the data bits transmitted over the communications link are overhead bits which reduces the overall throughput and efficiency. On the other hand, larger blocks are prone to error which may require one or more retransmissions in order to transmit so many bits reliably. Consequently, maximum and/or minimum fixed data block size limits may be set depending upon the application.

Figure 6:
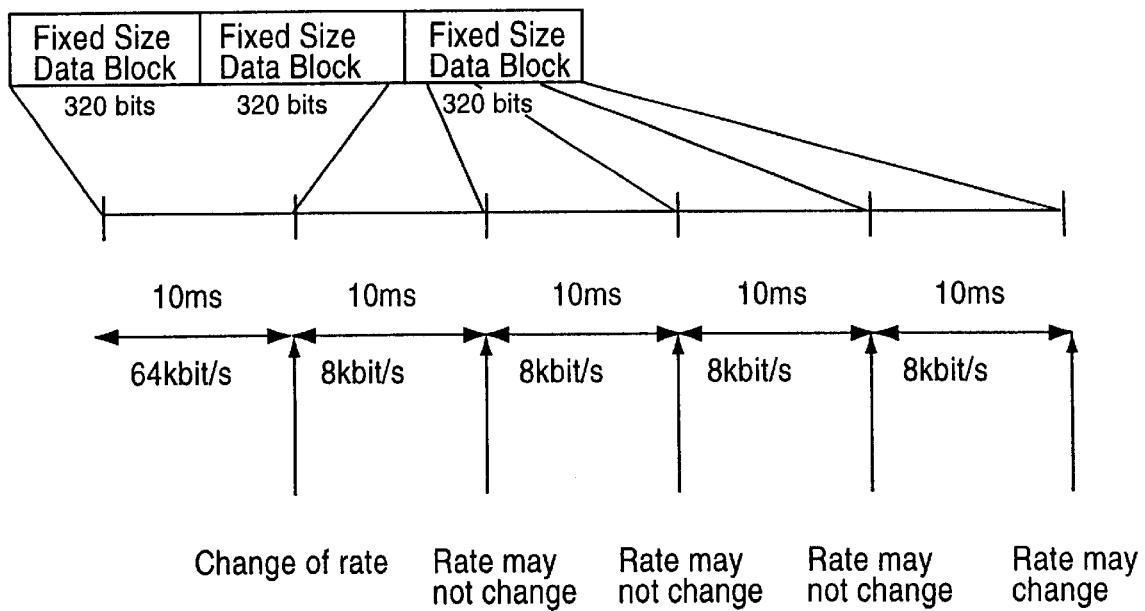
FIG. 6 is a diagram illustrating another example application of the present invention.

Consider an example where the communications device 1 may transmit over the communications link 5 using any one of the following available transmission rates: 8 kbit/s, 32 kbit/s, 64 kbit/s. Employing equation (1), the fixed block size is ten milliseconds * eight kbit/s which equals 80 bits. It may be that a block size of 80 bits is too small, i.e., less than a threshold (T) as shown in decision block 28 in FIG. 4. In that case, the block size is set at 320 bits consistent with the next higher rate of 32 kbit/s, but the highest frequency at which the transmission rate over communications link 5 may change is reduced by a factor inversely proportional to the difference between the lowest and next lowest transmission rate. In this example, that factor is four. Therefore, the highest frequency at which the transmission rate may change in this example is 40 milliseconds when the transmission is 8 kbit/s. FIG. 6 shows that the fixed size data block of 320 bits is transmitted using four frame intervals of 80 bits each. During those four frame intervals, the transmission rate may not change. Thus, the invention limits the frequency at which transmission rates may change when low transmission rates are used (block 30). Again, the present invention ensures that even though the transmission rate may change dramatically, e.g., from 64 kbit/s to 8 kbit/s, the size of the data block is determined so that all of the frame time intervals are employed to transmit useful overhead and payload information.

Figure 7:
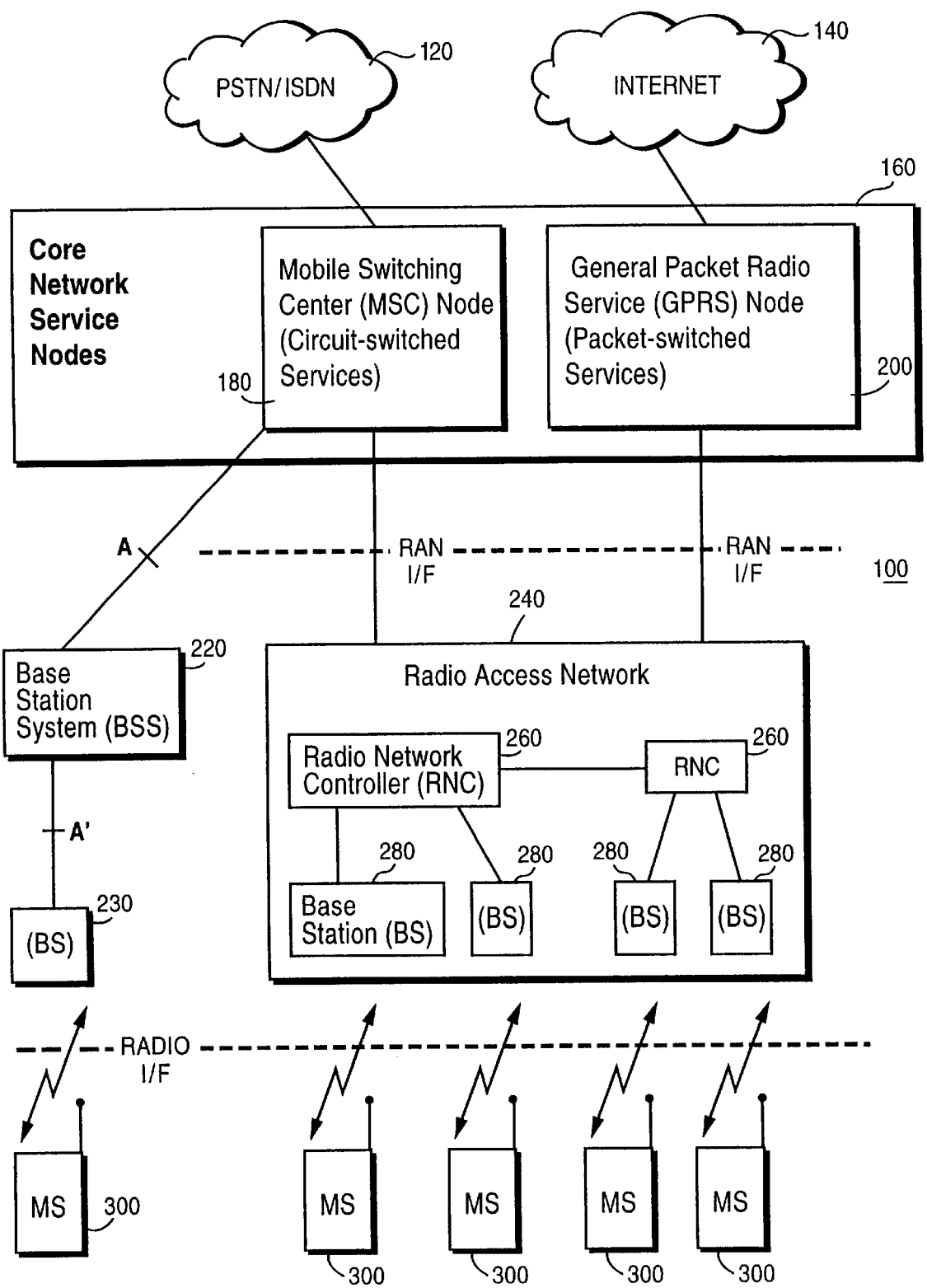
FIG. 7 is a function block diagram of a mobile radio communications system in which the present invention may be advantageously employed in another example embodiment of the present invention.

The present invention may be advantageously applied to any communications system including mobile communications network systems that are FDMA-, TDMA-, and CDMA-based systems. FIG. 7 shows an example mobile communications system 100. A representative connection-oriented, external core network, shown as cloud 120, may be for example the Public Switched Telephone Network (PSTN) and/or the Integrated Services Digital Network (ISDN). A representative connectionless-oriented, external core network, shown as cloud 140, may be for example the Internet. Both networks are coupled to corresponding service nodes 160.

The PSTN/ISDN connection-oriented network 120 is connected to a connection-oriented service node shown as a mobile switching center (MSC) node 180 that provides circuit-switched services. In a mobile communications system such as the well-known GSM system employed in Europe and elsewhere, the mobile switching center 180 is connected over an interface A to a base station system (BSS) 220 which in turn is connected to a radio base station 230 over interface A'. The Internet connectionless-oriented network 140 is connected to a General Packet Radio Service (GPRS) node 20 tailored to provide packet-switched type services.

Each of the core network service nodes 180 and 200 connects to a radio access network (RAN) 240 over a radio access network interface. Each radio access network controller 260 is connected to a plurality of base stations 280 which communicate over the radio interface with a plurality of mobile stations 300. Although any radio access may be employed, radio access is preferably based on Wideband-CDMA (W-CDMA) with individual radio channels allocated using W-CDMA spreading codes. W-CDMA provides wide bandwidth for multimedia services and other high rate demands as well as robust features like diversity handoff and RAKE receivers to ensure high quality.

Figure 8:
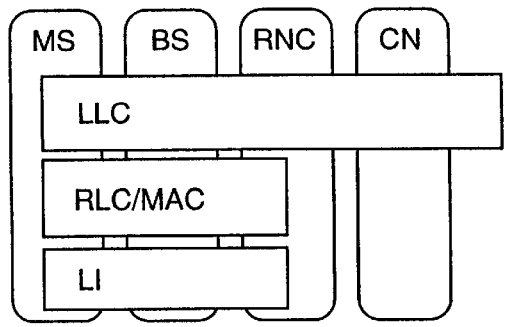
FIG. 8 is a diagram illustrating various communication protocol layers employed in communicating between mobile station, base station, radio network controller, and core network service nodes in a mobile communications system in FIG. 7.

FIG. 8 illustrates a schematic view of a possible communications protocol stack of lower communication protocol layers for use in the mobile communications system 100 shown in FIG. 7. A radio link control/medium access control (RLC/MAC) protocol layer is placed on top of a physical protocol layer L1. Assuming a Wideband-CDMA physical layer, the physical protocol layer L1 as well as the RLC/MAC terminate at the radio network controller (RNC) for diversity handover purposes. The third protocol layer corresponds to a logical link control (LLC) which terminates at the core networks (CNs). The RLC/MAC and LLC protocol layers may be viewed as lower and higher data link layer type protocol levels, respectively, in the context of the standard OSI model.

While each of these three protocol layers provide numerous functions, for purposes of describing this particular embodiment of the present invention, only certain tasks are described. At the physical layer, data streams originating from different communications services are multiplexed onto a radio communications channel. These services can have different quality of service requirements, e.g., different bit error requirements, different types of coding (convolutional coding, Reed-Solomon coding, etc.), and different transmission rates. To change the transmission rate, for example in the uplink path from the mobile station to the base station, the spreading factor of the spreading code assigned to that mobile station is changed. The mobile station, therefore, may transmit data for different services at the same time while also using the limited radio resources efficiently by adapting to the required transmission rate for a specific service.

Figure 9:
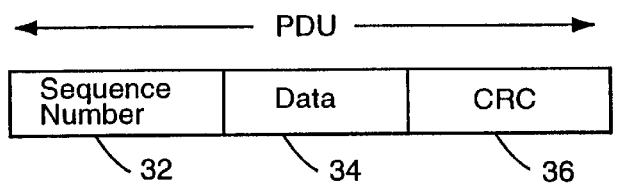
FIG. 9 is a simplified diagram of a PDU format.

Reliable transmission over the radio interface is achieved, for example, using an Automatic Repeat reQuest (ARQ) scheme at the RLC protocol layer. Higher layer data packets provided by the LLC protocol layer are segmented into smaller blocks, referred to as RLC protocol data units (PDUs), suitable for transmission over the radio interface. An RLC PDU is the smallest retransmission unit. An example RLC PDU is shown in FIG. 9 and includes a header field 32 having among other things a sequence number, a payload data field 34 which contains a portion of the LLC message to be retransmit, and an error detection and/or correction field such as a cyclic code redundancy check (CRC) 36. Thus, if a packet is not reliably received from a receiving device, it is retransmit by the RLC layer.

Similar to what was described above, the RLC PDU size is fixed and is determined based on the highest frequency at which the transmission rate may change and the minimum or lowest transmission rate. Typically the transmission rate is specified in a transmission format along with other parameters such as coding information, interleaving information, and repetition/puncturing schemes for rate matching.

Figure 10:
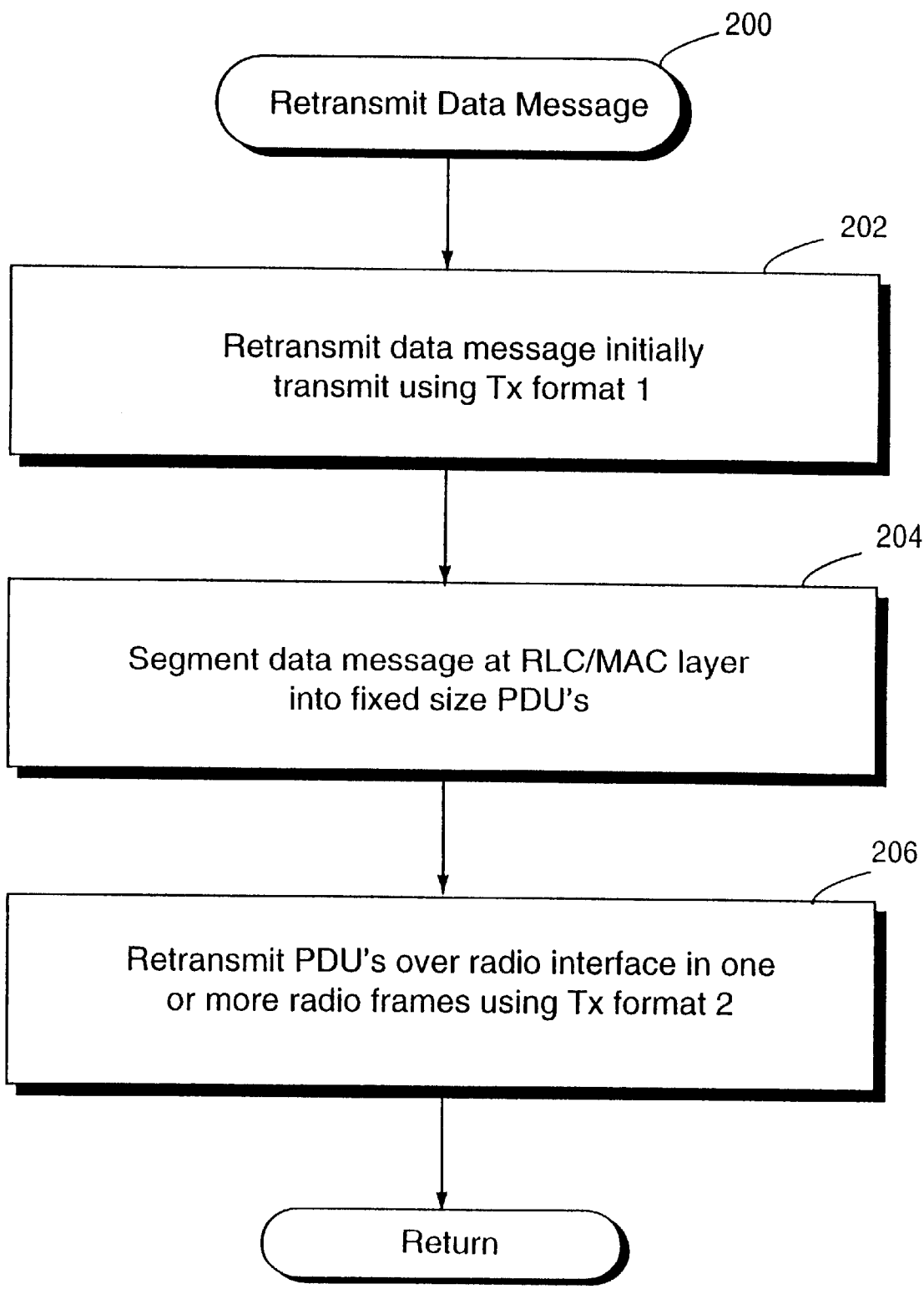
FIG. 10 is a flowchart diagram illustrating a Retransmit Data Block routine 200 in accordance with an example application of the present invention.

A Retransmit Data Message routine 200 is now described in conjunction with the flowchart shown in FIG. 10. An indication is made to retransmit a data message which was initially transmit using a first transmission format (block 202). The RLC layer segments the data message into fixed size PDUs (block 204). The fixed size of the PDUs is determined in accordance with the Block Size routine 20 shown in FIG. 4. The fixed size PDUs are retransmitted over the radio interface fully occupying one or more radio frames using a different, second transmission format (block 206). Even though the two different formats include two different transmission rates, the fixed PDU size, having been optimally selected, ensures that there is efficient use of radio resources.

While the present invention has been described with respect to particular embodiments, those skilled in the art will recognize that the present invention is not limited to these specific exemplary embodiments. Different formats, embodiments, and adaptations besides those shown and described as well as many variations, modifications, and equivalent arrangements may also be used to implement the invention. Therefore, while the present invention has been described in relation to its preferred embodiments, it is to be understood that this disclosure is only illustrative and exemplary of the present invention and is merely for the purposes of providing a full and enabling disclosure. Accordingly, it is intended that the invention be limited only by the spirit and scope of the claims appended hereto.

What is claimed is:

1. A method of transmitting data at variable rates over a communications link in predetermined time intervals, where each of the predetermined time intervals has the same duration, comprising:

receiving data for transmission over the communications link;

detecting a first transmission rate for transmission over the communications link;

providing data bits at the first transmission rate into fixed size data blocks, each fixed size data block having the same number of bits;

transmitting over the communications link at the first transmission rate during one or more of the predetermined time intervals a first number of the fixed size data blocks corresponding to the first transmission rate;

detecting a change in transmission rate over the communications link from the first transmission rate to a second transmission rate;

providing data bits at the second transmission rate into the fixed size data blocks; and transmitting a second number of the fixed size data blocks corresponding to the second transmission rate during one or more predetermined time intervals.

2. The method in claim 1, wherein the fixed size of each data block is determined so that the fixed size data blocks fully occupy each of the one or more predetermined time intervals for both the first and second transmission rates with useful information.

3. The method in claim 1, wherein the fixed size of each data block is determined based on a frequency at which the transmission rate may change and a minimal data transmission rate.

4. The method in claim 3, wherein the frequency corresponds to a maximum frequency at which the transmission rate may change and the minimal data transmission rate corresponds to the lowest rate available at which data may be transmitted.

5. The method in claim 3, wherein the fixed size of each of the fixed size data blocks must exceed a predefined minimum size.

6. The method in claim 3, wherein the maximum frequency at which the transmission rate may change is reduced when the data transmission rate is below a predefined rate.

7. The method in claim 1, wherein the transmission rate is prevented from changing during the predetermined time interval.

8. The method in claim 1, further comprising:

retransmitting at the second transmission rate one or more of the first number of data blocks during one of the predetermined time intervals, wherein the retransmitted one or more of the first number of data blocks together with any one or more of the second number of data blocks fully occupy the one or more predetermined time intervals.

9. The method in claim 1, wherein the communications link employs a wire or optical cable for transmitting data.

10. The method in claim 1, wherein the communications link employs a wireless radio frequency resource for transmitting data.

11. A method of retransmitting data at variable rates at a first communications protocol layer in predetermined time intervals, where each of the predetermined time intervals has the same duration, comprising:
  receiving a request for retransmission of a data message previously transmitted using a first transmission format specifying a first transmission rate;
  segmenting at a second communications protocol layer above the first communications protocol layer the data message to be retransmit into fixed size protocol data units (PDUs), each fixed size PDU having the same number of bits independent of whether the PDU has the first or a second transmission format; and
  transmitting the fixed size PDUs via the first communications protocol layer using a second transmission format specifying a second transmission rate different from the first transmission rate at which the data message was originally transmitted during one or more of the predetermined time intervals.

12. The method in claim 11, wherein different transmission formats include different coding schemes, interleaving lengths, or repetition schemes.

13. The method in claim 11, wherein each PDU includes a header having a sequence number, at least a portion of the data message, and an error detection field.

14. The method in claim 11, wherein the fixed size of each PDU is selected so that the PDUs integrally occupy the predetermined time interval despite differences in transmission formats.

15. The method in claim 14, wherein the PDUs occupy the predetermined time interval without having to add filler data bits to complete the predetermined time interval.

16. The method in claim 11, wherein the fixed PDU size is determined based on a frequency at which the transmission rate may change and a minimal data transmission rate.

17. The method in claim 16, wherein the frequency corresponds to a maximum frequency at which the transmission rate may change and the minimal data transmission rate corresponds to the lowest rate available at which data may be transmitted.

18. The method in claim 17, wherein the maximum frequency at which the transmission rate may change is reduced when the data transmission rate is below a predefined rate.

19. The method in claim 11, wherein the transmission rate is prevented from changing during the predetermined time interval.

20. A communications device comprising:
  a buffer configured to store data for transmission over a communications link;
  data processing circuitry configured to detect a first transmission rate associated with data to be transmitted over the communications link, and provide data bits at the first transmission rate into fixed size data blocks, each fixed size data block having the same number of bits; and
  a transmitter configured to transmit over the communications link at the first transmission rate during one or more of the predetermined time intervals, each time interval having the same duration, a first number of the fixed size data blocks per time interval corresponding to the first transmission rate;
  wherein the data processing circuitry is configured to detect a change in transmission rate over the communications link from the first transmission rate to a second transmission rate, provide data bits at the second transmission rate into the fixed size data blocks, and transmit a second number of the fixed size data blocks per time interval corresponding to the second transmission rate during one or more of the predetermined time intervals.

21. The communications device in claim 20, wherein the fixed size of each data block is determined so that the fixed size data blocks fully occupy the one or more predetermined time intervals with useful information for both the first and second transmission rates.

22. The communications device in claim 20, wherein the fixed size of each data block is determined based on a frequency at which the transmission rate may change and a minimal data transmission rate.

23. The communications device in claim 22, wherein the frequency corresponds to a maximum frequency at which the transmission rate may change and the minimal data transmission rate corresponds to the lowest rate available at which data may be transmitted.

24. The communications device in claim 22, wherein the fixed size of each of the fixed size data blocks must exceed a predefined minimum size.

25. The communications device in claim 24, wherein the maximum frequency at which the transmission rate may change is reduced when the data transmission rate is below a predefined rate.

26. The communications device in claim 20, wherein the transmission rate is prevented from changing during the predetermined time interval.

27. The communications device in claim 20, wherein the transmitter is configured to retransmit at the second transmission rate one or more of the first number of data blocks during one of the predetermined time intervals, and
  wherein the retransmitted one or more of the first number of data blocks together with any one or more of the second number of data blocks fully occupy the one or more predetermined time intervals.

28. The communications device in claim 20, wherein the communications link includes a wire or an optical cable for transmitting data.

29. The communications device in claim 20, wherein the communications link includes a wireless radio frequency resource for transmitting data.

30. The communications device in claim 20, wherein the communications device is a mobile radiotelephone.

31. The communications device in claim 20, wherein the communications device is a radio base station.

32. A communications protocol for data communications over a communications link between a mobile station and a base station, comprising:
  a first communications protocol layer for transmitting data over the communications link at variable rates in predetermined time intervals, where each of the predetermined time intervals has the same duration, and
  a second communications protocol layer for:
    (a) receiving a request to retransmit a data message previously transmitted using a first transmission format specifying a first transmission rate, and
    (b) segmenting the data message into fixed size protocol data units (PDUs),
  each fixed size PDU having the same number of bits, wherein the fixed size PDUs may be transmit at a second transmission rate different from the first transmission rate at which the data message was originally transmit during one or more of the predetermined time intervals via the first communications protocol layer.

33. The communications protocol of claim 32 as applied to a code division multiple access (CDMA) mobile communications system, wherein the first communications protocol layer employs a spreading code in transmitting the PDUs over a radio communications link and the second communications protocol layer corresponds to a radio link control access control (RLC) protocol layer.

* * * * *